United States Patent
Balentine et al.

(10) Patent No.: US 10,470,476 B2
(45) Date of Patent: Nov. 12, 2019

(54) SPREAD

(71) Applicant: Upfield USA Inc., Englewood Cliffs, NJ (US)

(72) Inventors: Douglas Ashley Balentine, Harriman, NY (US); Nicole Dawn Becker, North Brunswick, NJ (US); Monika Maria Tobolewska, Closter, NJ (US)

(73) Assignee: UPFIELD US INC., Englewood Cliffs, NJ (US)

( * ) Notice: Subject to any disclaimer, the term of this patent is extended or adjusted under 35 U.S.C. 154(b) by 26 days.

(21) Appl. No.: 13/837,651

(22) Filed: Mar. 15, 2013

(65) Prior Publication Data

US 2014/0272080 A1   Sep. 18, 2014

(51) Int. Cl.
| A23D 7/00 | (2006.01) |
| A23D 7/04 | (2006.01) |
| A23L 33/115 | (2016.01) |

(52) U.S. Cl.
CPC ............. *A23D 7/001* (2013.01); *A23D 7/04* (2013.01); *A23L 33/115* (2016.08)

(58) Field of Classification Search
CPC ...... A23D 7/001; A23D 7/0056; A23D 7/013; C11C 3/10; A21D 2/165
See application file for complete search history.

(56) References Cited

U.S. PATENT DOCUMENTS

| 4,961,953 | A | | 10/1990 | Singer et al. | |
| 5,374,445 | A | * | 12/1994 | Havenstein et al. | 426/603 |
| 6,156,370 | A | | 12/2000 | Huizinga et al. | |
| 6,630,192 | B2 | | 10/2003 | Sundram et al. | |
| 2005/0069620 | A1 | * | 3/2005 | Ullanoormadam | 426/603 |
| 2011/0104326 | A1 | * | 5/2011 | Perlman et al. | 426/2 |

FOREIGN PATENT DOCUMENTS

| CA | 2098314 C | * | 12/2003 |
| EP | 0500152 | | 8/1992 |
| EP | 1688044 | | 8/2006 |
| WO | WO0064276 | | 11/2000 |
| WO | WO2007039020 | | 4/2007 |
| WO | WO2008085019 A1 | | 7/2008 |
| WO | WO2012079964 A1 | | 6/2012 |

OTHER PUBLICATIONS

Mintel, Non-Hydrogenated Margarine, Mar. 2005, pp. 1-2 (http://www.gnpd.com).
Mintel, Omega Care Blend Table Spread, Jan. 2003, pp. 1-2 (http://www.gnpd.com).
Mintel, Omega3plusMargarine, Aug. 2009, pp. 1-2 (http://www.gnpd.com).
Alderliesten, "Mean Particle Diameters. Part I: Evaluation of Definition Systems", Part. Part. Syst. Charact., 1990, vol. 7, pp. 233-241.
Kochhar, "Influence of Processing on Sterols of Edible Vegetable Oils", Prog Lipid Res, 1983, vol. 22, pp. 161-188.
Ratnayake et al., "trans Fatty Acid Content of Canadian Margarines Prior to Mandatory trans Fat Labelling", Journal American Oil Chemist Society, 2007, vol. 84, pp. 817-825.
Ratnayake et al., "Trans Fatty Acids in Canadian Margarines: Recent Trends", Journal American Oil Chemists Society, 1998, vol. 75, No. 11, pp. 1587-1594.
Fat Continuous Spread (Admitted Prior Art), document, dated Mar. 14, 2014.
Deorah Kotz, Study fuels debate on linking dietary fats to heart disease, Daily Dose, Mar. 24, 2014, pp. 1-4, US.
Emily H Phares, Saturated or not: Does type of fat matter?, The Nutrition Source, May 15, 2014, pp. 1-4, http://www.hsph.harvard.edu/nutritionsource/2014/05/15/saturated-or-not-does-type-of-fat-matter/, US.
Becel Vegan Margarine, Database GNPD online MINTEL, Apr. 2010, pp. 1-2.
Canola Harvest premium Margarine, Database GNPD online MINTEL, Sep. 2006, pp. 1-2.
Egert et al., Dietary a-Linolenic Acid, EPA, and DHA Have Differential Effects on LDL Fatty Acid Composition but Similar Effects on Serum Lipid Profiles in Normolipidemic Humans, The Journal of Nutrition, May 2009, pp. 861-868, vol. 139 No. 5.
Helios Original Margarine, Database GNPD online MINTEL, Dec. 2010, pp. 1-2.
Jacques, et al., Modified milk fat reduces plasma triacylglycerol concentrations in normolipidemic men compared with regular milk fat and nonhydrogenated margarine, The American Journal of Clinical Nutrition, 1999, pp. 983-991, vol. 70.
Kroustallaki et al., Fatty acid composition of Greek margarines and their change in fatty acid content over the past decades, International Journal of Food Sciences and Nutrition, Nov. 2011, pp. 685-691, 62 (7).
Matsuzaki et al., General Properties of Margarine, Cooking Oil and Confectionery on the Market in Czech, Hungary, and Poland, Journal of Oleo Science, 2001, pp. 65-72, vol. 50 No. 1.
Meremae et al., Trans Fatty Acid Contents in Selected Dietary Fats in the Estonian Market, Journal of Food Science, 2012, pp. T163-T168, vol. 77 Nr. 8.
Müller et al., Replacement of Partially Hydrogenated Soybean Oil by Palm Oil in Margarine Without Unfavorable Effects on Serum Lipoproteins, Lipids, 1998, pp. 879-887, vol. 33 No. 9.
Nutrition Panel Crystal Mirage Margarine, Nutrition Panel Crystal Mirage Margarine, pp. 1.

(Continued)

*Primary Examiner* — Subbalakshmi Prakash
(74) *Attorney, Agent, or Firm* — Arent Fox LLP

(57) ABSTRACT

A spread or margarine which is intended to serve as a tasty, indulgent product and at the same time provide good health benefits to the consumer. The spread combines high levels both of monounsaturated fatty acids, which are thought to be a beneficial component of the Mediterranean diet, and linoleic acid, a known LDL-cholesterol lowering moiety. The spread includes low levels of saturated fatty acids and trans fat acids.

10 Claims, No Drawings

(56) References Cited

OTHER PUBLICATIONS

Nutrition Panel Pick 'n Pay Extra Lite Low Fat Spread, Nutrition Panel Pick 'n Pay Extra Lite Low Fat Spread, pp. 1-2.
Strawberry Jam Flavoured Margarine Spread, Database GNPD Online MINTEL, Sep. 2011, pp. 1-2.
Teah, Y.K. et al, Margarine formulation: A survey of commercial margarine products of tropical and temperate countries, PORIM Report, 1982, pp. 39-50.
Tonstad et al., Serum cholesterol response to replacing butter with a new trans-free margarine in hypercholesterolemic subjects, Nutrition, metabolism, and cardiovascular diseases NMCD, 2001, pp. 320-326.
Wijesundera et al., Industrially Produced trans Fat in Foods in Australia, Journal of the American Oil Chemists' Society, May 2007, pp. 433-442, vol. 84 Issue 5.
Search Report in PCTEP2014054743, dated Jun. 25, 2014.
Written Opinion in PCTEP2014054743, dated Jun. 25, 2014.

* cited by examiner

SPREAD

BACKGROUND OF THE INVENTION

While much is known concerning the effect of nutrition on health, scientific knowledge does not always lead to improvements in the diets of consumers. For instance, although many scientists believe that ingestion of saturated fatty acids should be minimized, consumers continue to eat foods which are relatively high in these components. One example of such a food is butter.

In recent years, butter consumption has been increasing despite the fact that labels show that it typically contains substantially more saturated fat than soft spreads made from vegetable oils. This may be partly a result of historical consumer concerns over trans fatty acids. However, spread manufacturers have been removing trans fatty acids from their products so that many soft spreads include extremely low amounts of trans fatty acids as well as low levels of saturated fats. Moreover, consumers unfortunately sometimes migrate toward products which they consider an indulgence despite known nutritional drawbacks. Although some consumer tests show certain soft spreads taste better than butter, many consumers continue to consider butter as the "gold standard" tastewise.

Much scientific interest has been focused on the Mediterranean diet. This has accelerated with the recent report in the New England Journal of Medicine of a study showing the Mediterranean diet as useful in preventing heart disease in individuals at high risk. Among the components of the Mediterranean diet are olive oil and nuts, products which are relatively high in monounsaturated fatty acids. Of course, these are not the only fatty acids which have engaged the attention of nutritionists. Other fatty acids of interest for maintaining good health include the omega-6 acid, linoleic acid, which for many years has been known to be useful to serum lower LDL cholesterol.

SUMMARY OF THE INVENTION

The invention concerns a spread or margarine which is intended to serve as a tasty, indulgent product and at the same time provide good health benefits to the consumer. The spread combines high levels both of monounsaturated fatty acids, which are thought to be a beneficial component of the Mediterranean diet, and linoleic acid, a known LDL-cholesterol lowering moiety. The spread includes low levels of saturated fatty acids and trans fatty acids. While spreads formulated to provide health benefits have been known, by combining an indulgent taste with heart healthy components it can be expected that the health benefits will actually be realized even by those consumers who place taste above health.

In one preferred embodiment, the invention is directed to an edible plastic spread which includes at least 70 wt % of a fat phase, and at least 15% of an aqueous phase. The fat comprises less than 1.5 wt % trans fatty acids, less than 18 wt % saturated fatty acids, at least 30 wt % monounsaturated fatty acids, and at least 30 wt % polyunsaturated fatty acids. Especially useful is that the spread is fat continuous. For clarity, unless otherwise indicated or clearly required by context, percentages of fatty acids are given herein in terms of the total amount of fatty acids, i.e., the calculation excludes the glycerol moiety of the triglyceride.

The spreads of the invention preferably include similar levels of monounsaturated fatty acids and polyunsaturated fatty acids to attempt to ensure that consumers receive full benefits of both. For example, the monounsaturated fatty acids are preferably between 125% and 75% of the level of polyunsaturated fatty acids, especially between 125% and 80%, more preferably between 125% and 90% (calculated by dividing the monounsaturated fatty acids weight percent in the fat phase by the polyunsaturated fatty acids weight percent in the fat phase).

The margarines or spreads of the invention can be made by employing as liquid oil a combination of canola oil, sunflower oil and soybean oil. Typically the liquid oils are combined with a hard fat which provides structure for the spread. Preferred levels of canola oil and sunflower oil, as a percentage of the fat phase are 30 wt % each or higher, especially 35 wt % each or higher.

The indulgent taste of the spreads of the invention is preferably reflected in one or more of the following: texture and melting behavior of the emulsion/spread measured by Stevens Value, N-line, water droplet size and water droplet distribution thereby describing softness of texture and smooth melting behavior resulting in good release of flavor and taste ingredients (such as salt, acids, and proteins) while swallowing/eating the product. Thus, the spread preferably
a) has N-values in the following ranges:
a)

| N10 | N20 | N30 | N35 |
|---|---|---|---|
| 5-10 | 2.5-6 | 0.2-2 | <2 |
| | Preferably: | | |
| 5.5-8.1 | 3-4.5 | 0.3-1.6 | <1, | b) aqueous phase particles size D3.3 of 3-6, most preferably from 3.9-5.3,
c) E-sigma for aqueous droplet size of 1.5-2.0, most preferably 1.8-1.95,
d) a Stevens value of 75-150, most preferably 90-120.

For a more complete understanding of the above and other features and advantages of the invention, reference should be made to the following detailed description of preferred embodiments.

DETAILED DESCRIPTION OF THE INVENTION

As used herein, "margarines" include an aqueous phase and at least 80 wt % of a fat phase. Although spreads are often used to mean similar products which contain less than 80% fat phase, for convenience in the present application the word "spreads" is used also to include margarines unless otherwise stated explicitly or clearly required by context. The product of the invention can be either a margarine having 80 wt % fat or higher, or a spread having less than 80 wt % fat.

Preferably the margarine or spread has a continuous fat phase and a dispersed aqueous phase, i.e., it is a water-in-oil emulsion. However, other arrangements can be used including but not limited to a continuous aqueous phase and dispersed fat phase (oil-in-water emulsion), or water-in-oil in water emulsion and oil-in-water-in oil emulsions.

Consistent with the desired indulgent taste, the margarine or spread of the invention preferably includes at least 70 wt % fat phase, especially at least 75 wt % fat phase up to 85 wt % fat phase or so.

The fat phase will typically predominantly comprise edible triglcyerides, e.g. 95-99 wt % of the fat phase will be edible triglyceride.

Since saturated fatty acids are ideally minimized, the fat of the spreads preferably include from 0 to less than 18 wt % saturated fatty acids, preferably from 1 to 17 wt % saturated fatty acids most preferably from 5 to 15 wt % saturated fatty acids. Likewise trans fatty acids are preferably minimized or eliminated. If present, they are preferably present at no more than 1.5 wt % of the fat, especially less than 1 wt % of the fat, more preferably between 0.001 wt % and 0.5 wt % of the fat.

In accordance with the invention, the fat includes at least 30 wt % monounsaturated fatty acids and at least 30 wt % polyunsaturated fatty acids. More preferably, the fat includes at least 35 wt % monounsaturated fatty acids and at least 35 wt % polyunsaturated fatty acids. The spreads of the invention preferably include similar levels of monounsaturated fatty acids and polyunsaturated fatty acids to attempt to ensure that consumers receive full benefits of both. For example, the monounsaturated fatty acids are preferably between 125% and 75% of the level of polyunsaturated fatty acids, especially between 125% and 80%, especially between 125% and 90% (calculated by dividing the monounsaturated fatty acids weight percent in the fat phase by the fat phase polyunsaturated fatty acids weight percentage). Soybean oil is preferably included at from 340 wt % of the total fat.

As indicated above, the fat phase is formed by combining one or more liquid (at 72° F.) oils with a hard fat, which is substantially solid at 72° F., and which imparts structure to the spread. Typically the fat includes 5-15 wt % hard fat and 85-95 wt % liquid oil. The liquid oils preferably are one or more of soybean, canola (low erucic acid rapeseed oil), corn, sunflower, rapeseed, safflower, cottonseed, peanut and olive oils. Especially preferred is a combination of soybean, canola and sunflower oils. Although less preferred, other digestible fat sources which may be used for the liquid oil are fish oil, milk fat, skim milk fat, and butterfat.

Omega 6 fats, such as linoleic acid, are known for their ability to lower serum LDL cholesterol levels in humans. Accordingly, it is preferred that at least 80 wt % of the polyunsaturated fats used in the invention, more preferably at least 90 wt % of the polyunsaturated fat used in the invention are omega 6 fats, more preferably they are linoleic acid.

If desired, a limited amount of omega 3 fats such as docosahexaenoic acid and eicosapantaenoic acid can be included within the fat of the invention.

In view of the desire to minimize or eliminate trans fats, the fats and oils used in the spread or margarine of the invention preferably are not subjected to chemical hydrogenation, that is hydrogenation other than occurs in nature.

Hard fats are solid at 72° F. and preferably comprise interesterified fractions of palm and palm kernel oils. Fats/oils useful in hard fats include soybean, canola, corn, sunflower, palm, Palm kernel, rapeseed, coconut, safflower, cottonseed, peanut and olive oils, fish oil, milk fat, skim milk fat, butterfat, lard and tallow and fractions or fractions thereof or interesterifications of the oils or their fractions. Examples of suitable hard fats, and procedures for their preparation, are described in Huizing a et al. U.S. Pat. No. 6,156,370, the disclosure of which is hereby incorporated herein.

The fat can be a single fat or a blend.

Non-digestible fats may also be used as the fat source. Among the non-digestible fats are included polyol polyesters of $C_8$ to $C_{22}$ fatty acids such as sucrose polyester, sucrose polyethers, silicone oils/siloxanes, polycarboxylic acid esters, branched chain fatty acid triglycerides, neopentyl alcohol esters, dicarboxylic acid esters, jojoba oil and triglycerol ethers. Non-digestible fats may be used as from 0 to 100% of the fat, especially from 10 to 90%, and most especially from 25 to 75%.

Non-lipid fat replacers may also be used, to provide body to the product. These include protein-based fat replacers such as those described in Singer et al., U.S. Pat. No. 4,961,953 and cellulosic bulking agents such as microcrystalline cellulose and carboxymethyl cellulose.

Optional ingredients in the fat phase include emulsifiers, salt (particularly sodium chloride or potassium chloride), preservatives, flavors, protein, vitamins, especially fat soluble vitamins such as vitamin. A, antioxidants, antimicrobials, and preservatives including citric and other acids. The emulsifiers can include mono- and diglycerides, polyglycerol esters, lecithin and polyoxyethylene sorbitan monoesters such as TWEEN 60 and TWEEN 80.

Emulsifiers may be included at from 0.05 to 2% by weight, typically not more than 1% by weight.

Coloring agents, such as beta carotene, paprika, turmeric, annatto and yellow #5 and 6 and combinations thereof may be employed. The yellow color may desirably be used in combination with an opacifier like $TiO_2$.

Preservatives, such as benzoic acid, sorbic acid, phosphoric acid, lactic acid, acetic acid, hydrochloric acid and the soluble salts thereof may be used.

Antioxidants may include propyl gallate, the tocopherols, including Vitamin E, butylated hydroxyanisole (BHA), butylated hydroxytoluene (BHT), nordihydrorguaiaretic acid (NDGA), tertiary-butylhydroquinon (TBQH) and citric acid. Metal chelators or sequestrants such as sodium calcium salts of ethylenediamine tetra acetic acid (EDTA) may also be used.

The aqueous phase comprises water and, optionally, other ingredients. A preferred ingredient is one or more gelling agents such as gelatin. It may be advantageous for the aqueous composition to be pre-gelled, i.e., gelled prior to combining the aqueous composition with the fat-continuous emulsion. Other suitable gelling agents include waxy maize starch such as Ultra-Tex 2, available from the National Starch and Chemical Co., Bridgewater, N.J. or a rice starch such as Remyrise AC. A particularly effective combination of gelling agents has proven to be gelatin and waxy maize or rice starch. Other gelling agents include carrageenan, and a gelling hydrolyzed starch derivative such as gelling maltodextrin, for example, Paselli maltodextrin SA2®.

The amount of gelling agent may lie between 0 and 15%, mostly between 0.1 and 25% based on the weight of the aqueous phase of the spread. If hydrolyzed starches are present, their level may be from 2-20%; other gelling agents may be used at levels of up to 10%, mostly 1-7%, most preferred 2-5%, all of these percentages being based on the weight of the aqueous phase.

Hydrocolloids which are thickening rather than gelling agents may also be used. Hydrocolloids are described in Zeitschrift fur Lebenmittletechnologie and Verfahrenstechnk 32 (1981) 6, pp. 253-256. Hydrocolloids in addition to those mentioned above include polysaccharides such as native and modified starches, cellulose derivatives, pectins, galleon, xanthan gum, agar, Danish agar, furcellaran, gum Arabic, guar gum, locust bean gum, algin, and alginates. Hydrocolloids will generally be used at levels of from 0.2 to 6%, based on total product. It will be appreciated that the gelling and thickening agents may be used in various combinations.

Additional ingredients which may be present in the aqueous phase include salt (particularly sodium chloride), preservatives, such as potassium sorbate, lactic and other acid, proteins, coloring agents, flavors, antimicrobials, antioxidants and vitamins, particularly water-soluble vitamins such as the B vitamins.

Proteins, water-soluble coloring agents, flavors, preservatives and antimicrobials and antioxidants useful in the aqueous composition are the same as those discussed above in connection with the fat phase, it being appreciated that generally the more hydrophilic additives are best placed in the aqueous phase.

An optional ingredient which may be included in the fat or the aqueous phase is the sterol or sterol ester. Sterols are known among other things, as cholesterol lowering agents.

In this application where reference is made to sterols or sterol esters, this also includes their saturated derivatives, the stanol or stanol esters, and combinations of sterol- and stanols and/or their esters.

Sterols or phytosterols, also known as plant sterols or vegetable sterols can be classified in three groups, 4-desmethylsterols, 4-monomethylsterols and 4,4'-dimethylsterols. In oils they mainly exist as free sterols and sterol esters of fatty acids although sterol glucosides and acylated sterol glucosides are also present. There are three major phytosterols namely beta-sitosterol, stigmasterol and campesterol. Schematic drawings of the components meant are as given in "Influence of Processing on Sterols of Edible Vegetable Oils" S. P. Kochhar; Prog. Lipid Res. 22: pp. 161-188.

The respective 5 alpha-saturated derivatives such as sitostanol, campestanol and ergostanol and their derivatives are in this specification referred to as stanols.

Preferably the (optionally esterified) sterol or stanol is selected from the group comprising fatty acid ester of 3-sitosterol, 3-sitostanol, campesterol, campestanol, stigmasterol, brassicasterol, brassicastanol or a mixture thereof.

The sterols or stanols are optionally at least partly esterified with a fatty acid. Preferably the sterols or stanols are esterified with one or more $C_{2-22}$ fatty acids. For the purpose of the invention the term $C_{2-22}$ fatty acid refers to any molecule comprising a $C_{2-22}$ main chain and at least one acid group. Although not preferred within the present context the $C_{2-22}$ main chain may be partially substituted or side chains may be present. Preferably, however the $C_{2-22}$ fatty acids are linear molecules comprising one or two acid group(s) as end group(s). Most preferred are linear $C_{8-22}$ fat acids as these occur in natural oils.

Suitable examples of any such fatty acids are acetic acid, propionic acid, butyric acid, caproic acid, caprylic acid, capric acid. Other suitable acids are for example citric acid, lactic acid, oxalic acid and maleic acid. Most preferred are myristic acid, lauric acid, palmitic acid, stearic acid, arachidic add, behenic acid, oleic add, cetoleic acid, erucic acid, elaidic acid, linoleic acid and linolenic acid.

When desired a mixture of fatty acids may be used for esterification of the sterols or stanols. For example, it is possible to use a naturally occurring fat or oil as a source of the fatty acid and to carry out the esterification via an interesterification reaction.

The amount of sterol in the spread, if used, is preferably from 0 to 15% on total weight of the spread, preferably from 0.5 to 10 wt %.

The amount of crystallized fat is determined by NMR at the indicated temperature, as described in "Fette, Seifen, Anstrichmittel" 80 (1978), 180-186 (N-value, expressed in weight percent). For example, N10 would indicate the amount of crystallized fat at 10° C.

The D3.3 value indicates the average particle size calculated with weighing factors according to volume. See M Alderliesten, Part, Part. Syst. Caract. 7 (1990), 233. D3.3 values herein are for the dispersed aqueous phase droplets. Unless otherwise indicated or required by context, D3.3 is given in microns.

E-sigma is the droplet size distribution when plotted as a function of the logarithm of the diameter .sigma. (E-sigma). e-sigma is a measure for the width of the droplet-size distribution.

The "Stevens" hardness (St) is expressed in grams. The product is stored at 5[deg.] C. and thereafter equilibrated for 24 hours at a temperature of 5[deg.] C. or 20[deg.] C. as indicated. The Stevens value is measured using a 6.4 mm 0 cylindrical penetration probe and a Stevens-LFRA Texture Analyzer (ex Stevens Advanced Weighing. Systems, Dunmore, U.K.) or SMS texture analyzer XT2 (ex Stable Microsystems, Surrey UK). The load range is 1000 g for LFRA and 25000 g for SMS TA-TX2 equipment. The Stevens LFRA Texture analyzer is operated in the "normal" mode and set at 10 mm penetration depth and 2 mm/s penetration rate.

The balance of the spread is largely water, which may be incorporated at levels of up to 30% by weight, more generally from 10 to 25 wt %, preferably from 20 to 25% by weight.

Unless stated otherwise or required by context, the terms "fat" and "oil" are used interchangeably herein. Unless otherwise stated or required by context, percentages are by weight.

Sterols and their esters shall not be counted when considering of components of the fat or aqueous phases or in the total fat of the product.

As indicated above, unless otherwise indicated or clearly required by context, percentages of fatty acids in this application are given in terms of the total amount of fatty acids, i.e., the calculation excludes the glycerol component of the triglyceride.

It will be appreciated in preparation of the spreads normally more hydrophobic additives will be added to the fat phase whereas more hydrophilic additives will normally be added to the aqueous phase.

EXAMPLE

| Fat Phase | |
|---|---|
| | Wt. % |
| Canola Oil | 41 |
| Sunflower Oil | 45 |
| Soybean Oil | 6 |
| Hard Fat* | 8 |
| saturated monoglyceride emulsifier | 0.13 |
| Lecithin | 0.25 |
| | 100 |

| Aqueous Phase | |
|---|---|
| | % |
| Citric Acid | 0.19 |
| K Sorbate | 0.5 |
| Calcium Disocium EDTA | 0.03 |
| Water | 87 |
| Salt | 7.3 |
| Buttermilk powder | 4.8 |
| Total | 100 |
| Oil Phase | 79.25 |
| Water Phase | 20.63 |
| Flavors | 0.1 |
| Vit E acetate | 0.01 |
| Vit D3 | 0.001 |
| Vit A palmitate | 0.003 |
| Beta Carotene | 0.001 |
| Total | 100 |

*wet fraction result of interesterification of palm kernel and palm oil fractions The aqueous phase pH is about 4.6.

Oil Phase Ingredients and Preparation

Liquid soybean oil (held at ambient temperatures), liquid canola oil (held at ambient temperatures), liquid sunflower oil (held at ambient temperatures), melted hard fat (melted and held at 140 F, above melting point), emulsifier/saturated monoglyceride (melted), emulsifier/lecithin (melted) are blended together and held at 130° F.

Water Phase Ingredients and Preparation

Water, buttermilk powder (bagged), salt (bagged), citric acid, calcium disodium EDTA, AND potassium sorbate are mixed together, and then heat treated for 15 minutes at 165° F.

Emulsion Preparation

The oil phase is brought to a batch tank and held at 130 F. Agitation is turned on and the aqueous phase is added. Then colors and flavors are added. The batch is then transferred to a run tank.

Margarine Process

The emulsion is sent through several cooling steps in scraped surface heat exchangers, and a working step in a crystallization unit to provide structure and growth of the fat crystals. The product is then filled into containers. So the margarine process is: Emulsion in Run tank—Scraped surface heat exchanger to cool to 80° F.—Scraped surface heat exchanger to cool to 70° F.—crystallization unit—Scraped surface heat exchanger to cool to 40° F.—fill into tubs.

The spread of the Example has an indulgent taste and approximately 39 wt % on fat monounsaturated fatty adds, almost 40 wt % on fat polyunsaturated fatty acids and only approximately 15 wt % on fat saturated fatty acids.

It should be understood of course that the specific forms of the invention herein illustrated and described are intended to be representative only, as certain changes may be made therein without departing from the clear teaching of the disclosure. Accordingly, reference should be made to the appended claims in determining the full scope.

What is claimed is:

1. An edible plastic spread comprising:
   a) from at least 70 wt % to less than 80 wt % of a fat phase having a fat, wherein the fat comprises:
      i) less than 1.5 wt % trans fatty acids,
      ii) less than 15 wt % saturated fatty acids,
      iii) from at least 30 wt % to about 39 wt % monounsaturated fatty acids, and
      iv) from at least 30 wt % to about 40 wt % polyunsaturated fatty acids,
      wherein the monounsaturated fatty acids are between 125% and 90% of the level of the polyunsaturated fatty acids, and wherein the fat has an N-value selected from the group consisting of an N10 value of from 5 to 10, an N20 value of from 2.5 to 6, an N30 value of from 0.2 to 2, an N35 value of less than 2, and combinations thereof; and
   b) at least 15 wt % of an aqueous phase;
      wherein the spread is fat continuous, and has (i) an aqueous phase particle size D3.3 of from 3 to 6, (ii) an E-sigma for aqueous droplet size of from 1.5 to 2.0, and (iii) a Stevens value of from 75 to 150.

2. The spread of claim 1, comprising canola oil, sunflower oil and soybean oil.

3. The spread of claim 2, wherein the fat comprises at least 35 wt % canola oil and at least 35 wt % sunflower oil.

4. The spread of claim 3, wherein the wt % of canola oil is between 75% and 125% of the wt % of sunflower oil.

5. The spread of claim 1, wherein none of the fat has been subject to chemical hydrogenation.

6. The spread of claim 1, wherein at least 80 wt % of the polyunsaturated fats are omega-6 fatty acids.

7. The spread of claim 1, comprising at least 75 wt % fat phase.

8. The spread of claim 1, wherein the monounsaturated fatty acids comprise at least 35 wt % of the fat phase.

9. The spread of claim 1, wherein the polyunsaturated fatty acids comprise at least 35 wt % of the fat phase.

10. The spread of claim 1, wherein the fat has an N-value selected the group consisting of an N10 value from 5.5 to 8.1, an N20 value from 3 to 4.5, an N30 value from 0.3 to 1.6, a N35 value of less than 1, and combinations thereof, and wherein the spread has (i) an aqueous phase particle size D3.3 of from 3 to 6, (ii) an E-sigma for aqueous droplet size of from 1.5 to 2.0, and (iii) a Stevens value of from 75 to 150.

* * * * *